3,161,565
LYSINE OROTATE
Maurice Gustave Eugène Vigneron, Paris, France, assignor to A.E.C. Societe de Chimie Organique et Biologique, Commentry, France, a French body-corporate
No Drawing. Filed July 27, 1961, Ser. No. 127,154
Claims priority, application France, July 29, 1960, 834,523
7 Claims. (Cl. 167—55)

The present invention has for object to provide a new compound: lysine orotate, whose empirical formula is $C_{11}H_{18}N_4O_6$ and structural formula is:

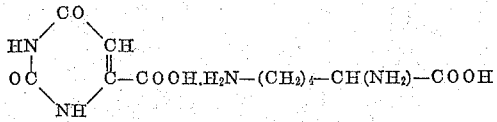

This compound has been found to possess an action on the protein synthesis, regeneration properties as concerns the hepatic tissues, of utility in the treatment of cirrhosis, and galactogenic properties.

Its molecular weight is 302.29 and its total nitrogen content is 18.5%.

It possesses the following physical properties:

White crystalline powder having a specific flavour.

Soluble in distilled water in the proportion of 100 parts at 20° C. and 10 parts at 100° C.

But slightly soluble in 19.5% ethanol.

Insoluble in ether, benzene and acetone.

The product melts instantaneously in the Maquenne block at a temperature of 315° C. and decomposes into a black product.

Among its chemical properties its ability to be hydrolyzed should be mentioned. When subjected to an acid hydrolysis, the product decomposes into its elements: orotic acid and lysine in the salt state split off.

The pH of the 10% aqueous solution of lysine orotate is between 6.5 and 7.1.

There will now be given an example of a process of preparing lysine orotate.

The following are weighed in a heat resistant 2000 ml. glass flask capable of being connected to a fluid-tight agitator and to a reflux condenser:

|  | G. |
|---|---|
| 50% solution of lysine base | 486 |
| Orotic acid | 260 |
| Water | 800 |

Stir well in cold state and then heat under constant mechanical stirring until complete dissolution, which requires a temperature of 85–90° C.

When full dissolution has been obtained, the source of heat is cut off and the following is added to the mixture under a constant stirring:

|  | G. |
|---|---|
| 95% ethanol | 700 |

Continue the mechanical stirring without stopping until the mixture has cooled and leave for 24 hours.

Filter. Drain. Wash with 300 ml. of 95% ethanol. Yield: 390–395 G. (79%).

The product thus obtained should satisfy the indicated chemical standards (solubility, melting point, pH, identification characters).

Furthermore, it should also satisfy the quantitative determinations indicated hereinafter.

The identification characteristics of lysine orotate can be determined on a 4% aqueous solution on which the following reactions are carried out:

(a) Add to 2 ml. of this solution 2 ml. of a diluted solution of hydrochloric acid.

There is formed an abundant white precipitate of orotic acid identified by its instantaneous melting point (345–346° C.) and by the titration of its total nitrogen content: 17.95%.

(b) Add to 2 ml. of this solution 2 ml. of phosphotungstic acid solution.

There is formed an abundant white precipitate.

(c) Add to 2 ml. of this solution 10 drops of 1% ninhydrin solution.

Heat on a water bath.

Violet colouring is very rapidly produced.

(d) Add to 2 ml. of this solution 2 ml. of a purified solution of potassium chromate.

There is immediately formed a yellow crystalline precipitate.

(e) Add to 2 ml. of this solution 3 ml. of a 5% aqueous solution of $NO_3Ag$.

An abundant white precipitate is formed.

The following quantitative determinations permit verifying the purity of lysine orotate.

(a) Titration of total nitrogen by the method described on page 1068 of Codex. It should not be less than 18% nor greater than 19%.

(b) Titration of amino-nitrogen by the potentiometric method described by Mr. Vigneron in his communication to the Académie de Pharmacie on February 3, 1960 (Ann. Pharm. Franc., 1960, being printed).

Lysine orotate reacts with perchloric acid in an anhydrous acetic medium as a compound containing 2 atoms of basic nitrogen.

1 ml. of $ClO_4H$ N/10 corresponds to 0.0151 g. of lysine orotate.

The pharmacological examination of lysine orotate reveals the following:

A. Toxicity

By the vein route in the mouse, it was found that the lethal dose is equal to 1.07 g./kg.

By the peritoneal route at the dose of 3 g./kg. no fatal case was found.

By the oral route in the rat, at the dose of 5 g./kg. no fatal case was noted.

B. Physiological Effects

Experiments have shown that lysine orotate favours growth at doses varying between 50 and 400 mg./kg.

The percentage increases in weight of groups of reference animals and groups of treated animals gave at the end of five weeks the following figures:

| | Percent |
|---|---|
| Percentage increase in the mean weight of the reference animals | 29.5 |
| Percentage increase in the mean weight of a group of animals for a dose of 50 mg./kg. | 32.2 |
| Percentage increase in the mean weight of a group of animals for a dose of 100 mg./kg. | 39.7 |
| Percentage increase in the mean weight of a group of animals for a dose of 400 mg./kg. | 40.3 |

Further, this product favours lactation.

The therapeutic indications of lysine crotate are for a large part due to its precursor action on the pyrimidic nucleotides and in particular the uridines. Thus this product is of utility due to the following properties:

Action on the protein synthesis manifested by reconstituting effects similar to those of cyanocobalamin (vitamin $B_{12}$).

Regenerating action on the hepatic tissues with improvement in the cirrhosis.

Galactogenic action.

In these indications, lysine orotate is advantageously administered in the form of tablets whose formula is for example the following:

|  | G. |
|---|---|
| Lysine orotate | 0.25 |
| Wheat starch | 0.0075 |
| Talc | 0.0225 |
| Potato starch | 0.02 |
| Magnesium stearate | Traces | for one finished tablet of 0.30 g.

Lysine orotate can be absorbed orally at doses varying between 0.25 g. and 1 g. per day.

This product can also be administered in the form of an injectable 4% aqueous solution and also in the form of suppositories with the excipients suitable for this form.

Having now described my invention what I claim as new and desire to secure by Letters Patent is:

1. Lysine orotate having the formula:

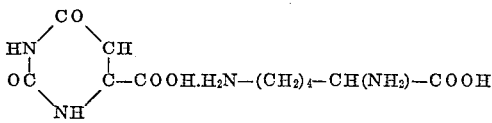

and having the characteristic of being water soluble.

2. A therapeutic composition in dosage unit form acting on the protein synthesis, and regenerating the hepatic tissues, useful in the treatment of cirrhosis, containing in each dosage unit an amount of from about 0.25 g. to about 1 g. of lysine orotate in a therapeutically-administrable carrier, said lysine orotate having the characteristic of being water soluble and thereby administrable orally and parenterally.

3. A composition as claimed in claim 2, put into the form of tablets administrable orally.

4. A composition as claimed in claim 3, the tablets having the following formula:

|  | G. |
|---|---|
| Lysine orotate | 0.25 |
| Wheat starch | 0.0075 |
| Talc | 0.0225 |
| Potato starch | 0.02 |
| Magnesium stearate | Traces | for one finished tablet of 0.30 g.

5. A composition as claimed in claim 2, put into the form of an injectable solution.

6. A composition as claimed in claim 2, put into the form of suppositories.

7. A therapeutic composition useful in the treatment of cirrhosis and administrable orally and parenterally comprising an aqueous solution of lysine orotate.

References Cited by the Examiner
UNITED STATES PATENTS

| 2,556,907 | 6/51 | Emmick | 260—501 |
| 2,738,299 | 3/56 | Frost | 167—65 |
| 2,802,864 | 8/57 | Vassel | 260—501 |
| 2,859,244 | 11/58 | White | 260—534 |
| 2,992,163 | 7/61 | Easton | 167—65 |
| 3,020,278 | 2/62 | Ferguson | 260—256.6 |
| 3,062,722 | 11/62 | Garofalo | 167—65 |

OTHER REFERENCES

Schwietzer: Chem. Abst., vol. 51, p. 6797e, 1957.
Burke: Chem. Abst., vol. 52, p. 5616(a), 1958.
Gordonoff: Chem. Abst., vol. 54, p. 19964(h), 1960, citing Intern. 2. Vitaminforsch., vol. 30, pages 206–9, 1959.
Kushima: Chem. Abst., vol. 53, p. 12488(e), 1959.
Schwietzer: Chem. Abst., vol. 53, p. 11650(h), 1959.
Vines: Chem. Abst., vol. 46, p. 7116(c), 1952.
Dolcetta: Chem. Abst., vol. 52, 16515f, 1958.
Dioguardi: Chem. Abst., vol. 52, 16, 593c, 1958.
Schwietzer: Chem. Abst., vol. 51, 6767e, 1957.
Brattgard: Chem. Abst., vol. 53, 6373–4, 1959.

LEWIS GOTTS, *Primary Examiner.*

FRANK CACCIAPAGLIA, Jr., MORRIS O. WOLK,
*Examiners.*